United States Patent

[11] 3,603,163

| [72] | Inventor | Robert R. Henry |
| | | Andover, Mass. |
| [21] | Appl. No. | 32,571 |
| [22] | Filed | Apr. 28, 1970 |
| [45] | Patented | Sept. 7, 1971 |
| [73] | Assignee | Yorkshire Industries, Inc. |
| | | Andover, Mass. |

[54] TRANSVERSE AND AXIAL POSITIONING APPARATUS
11 Claims, 3 Drawing Figs.

[52] U.S. Cl. ............................................. 74/22, 74/56
[51] Int. Cl. ....................................... F16h 37/16
[50] Field of Search ........................... 74/22, 56, 242.16

[56] References Cited
UNITED STATES PATENTS
3,552,931  1/1971  Doherty ................ 74/22
2,490,173  12/1949  Swahnberg ............ 74/22 X
687,030  /1901  Hunter ................. 74/22 X
FOREIGN PATENTS
201,742  0/1922  Great Britain ........ 74/22

Primary Examiner—William F. O'Dea
Assistant Examiner—Thomas R. Hampshire
Attorney—Charles C. Winchester ABSTRACT: Apparatus comprising a carrier coaxially and rotatably mounted on a stationary internal gear, a mounting member eccentrically and rotatably mounted in said carrier, a pinion nonrotatably and coaxially connected to said mounting member in driving engagement with said internal gear, a shaft nonrotatably connecting to said mounting member, an annular cam face on said carrier coaxially of said mounting member and facing said shaft, a slideable member axially movably and nonrotatably connected to said shaft, a cam follower fixedly connected to said slideable member and extending into engagement with said cam face, and a biasing member biasing said slideable member and said cam follower toward said cam face.

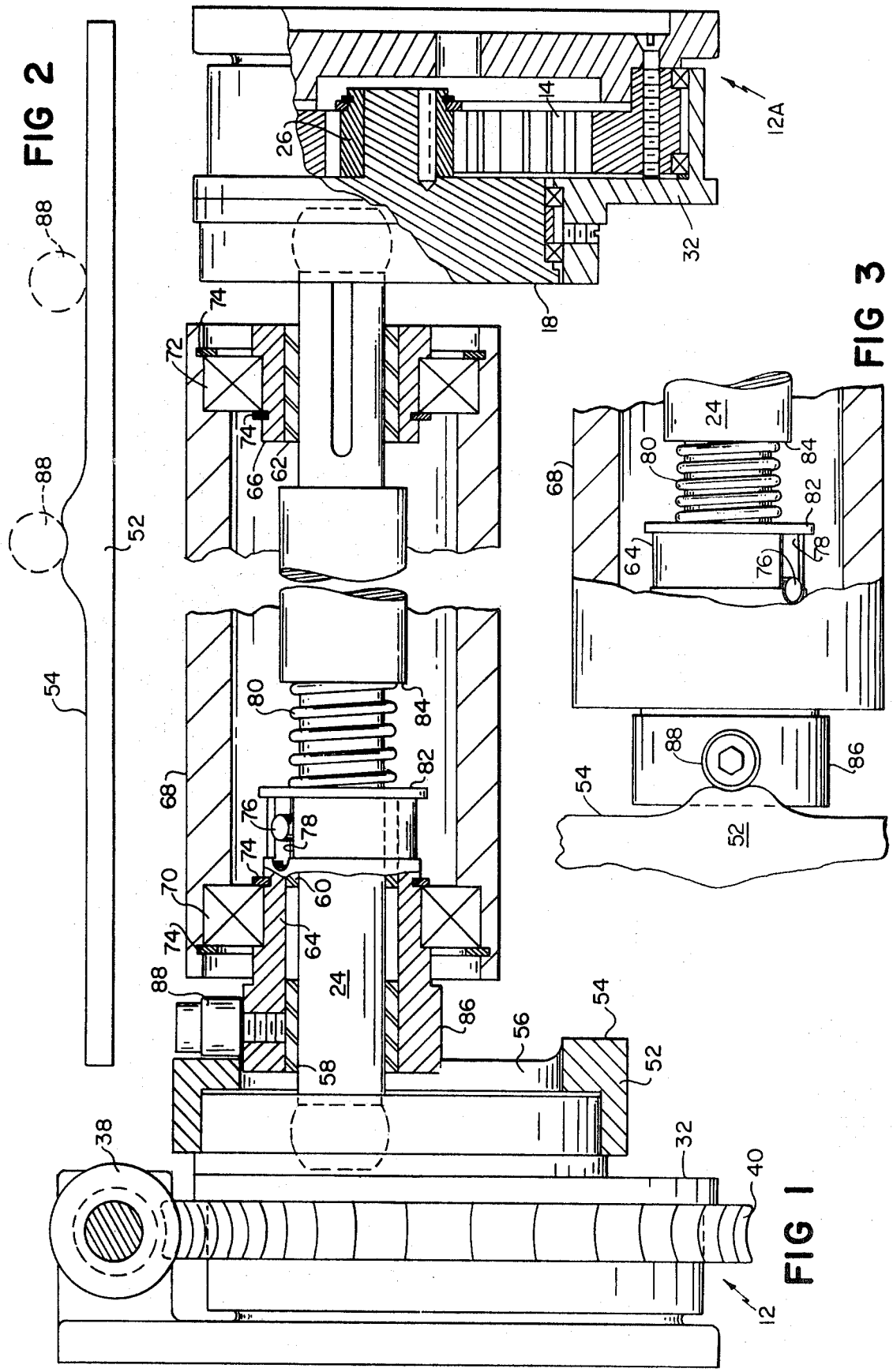

TRANSVERSE AND AXIAL POSITIONING APPARATUS

This invention relates to positioning apparatus for adjusting an element on a shaft transversely of said apparatus from one shaft position to another and axially along the axis of the shaft.

More particularly, it is a principal object of this invention to provide, in apparatus of the type described in U.S. Pat. No. 3,399,582, dated Sept. 3, 1968, means for axially moving, in a predetermined controlled manner, an element on a shaft which is adjustable transversely of said apparatus.

The invention features positioning apparatus comprising, in combination: adjustment apparatus having a rotatable carrier; a rotatable mounting member supported by the carrier eccentrically to the axis of the carrier, a shaft nonrotatably connected to one side of the mounting member, eccentrically of the axis of the mounting member; and on the other side of the mounting member a pinion coaxial with the mounting member and nonrotatably connected thereto and an internal gear in driving engagement with the pinion, the gear being mounted coaxially of the carrier and nonrotatably relative thereto; drive means connected to the carrier for rotating the carrier; an annular cam face positioned on said carrier concentric of said mounting member and facing said shaft; a slideable member axially moveably and nonrotatably connected to said shaft; a cam follower connected to said slideable member nonmovably relative thereto and extending therefrom to a position opposite said cam face for engagement therewith; and a biasing member biasing said slideable member and said cam follower toward said cam face for maintaining said cam follower in engagement with said cam face.

In preferred embodiments the carrier and shaft axes are equidistant from the mounting member axis and the pinion has a pitch diameter one half that of the internal gear. A rotatable member may also be rotatably supported on said slideable member for rotation independent thereof. In the usual embodiment a pair of adjustment units are provided supporting the shaft at each end thereof and providing simultaneous transverse adjustment of both shaft ends.

Other objects, features, and advantages of this invention will be apparent to those skilled in the art from the following detailed description of a preferred embodiment thereof taken together with the accompanying drawings, in which:

FIG. 1 is a fragmentary, partially sectional, elevation view of apparatus embodying the invention;

FIG. 2 is a developed, elevation view of the cam; and

FIG. 3 is a fragmentary, elevation view of the apparatus shown in FIG. 1 rotated 90° to a transversely and axially adjusted position thereof.

With reference to FIG. 1 of the drawing, it will be seen that the apparatus comprises a pair of adjustment units 12,12A mounted on opposite sides of a frame (not shown) facing each other with corresponding parts in matching rotative positions and coaxially aligned. Units 12 and 12A are identical except that unit 12 includes a worm 38 and worm gear 40 and a cam 52.

Detail of the adjustment units 12,12A may be had by reference to U.S. Pat. No. 3,399,582, dated Sept. 3, 1968, and, in particular, the embodiment shown in FIG. 8 thereof. In general, however, as shown in FIG. 1, with reference to adjustment unit 12A, each adjustment unit 12,12A includes an internal gear 14 which is mounted nonrotatably relative to the frame. A carrier 32 is rotatably supported on the outer periphery of and coaxially of internal gear 14.

Mounting member 18 is rotatably supported eccentrically in carrier 32. Shaft 24 extends from one side of mounting member 18 in unit 12A to the mounting member of unit 12. Shaft 24 is supported in mounting members 18 nonrotatably and eccentrically relative thereto.

A pinion gear 26 is positioned on the other side of mounting member 18, coaxially thereof, in mesh with internal gear 14. Pinion 26 is secured nonrotatably relative to mounting member 18.

Pinion 26 has a diameter one half that of internal gear 14. The shaft 24 and carrier 32 axes are equidistantly spaced from and are parallel to the axis of mounting member 18, the shaft axis being positioned on the pitch diameter of pinion 26.

Unlike unit 12A, unit 12 has drive means, including a worm gear 40, mounted on the periphery thereof. A coacting worm 38 is rotatably mounted on unit 12 in driving engagement with worm gear 40.

Nonrotatably secured, as by a press fit, to one carrier 32 of unit 12 is a cam 52 having an annular cam face 54 adjacent and concentric of the mounting member 18 of said unit 12. Cam face 54 faces shaft 24 and unit 12A and has a central aperture defining an inner edge 56 having a radius, from the axis of said mounting member 18, at least as great as the distance between the axis of mounting member 18 and the maximum distance of shaft 24 therefrom, in order to prevent interference of cam 52 with the movement of shaft 24. As shown in FIG. 2, cam face 54 has an irregular configuration conforming to the desired axial adjustment of a member on shaft 24.

Two bushings 58, 60, at one shaft end adjacent unit 12, and one bushing 62, at the other shaft end adjacent unit 12A, are positioned on shaft 24 in a slip fit for axial movement along the shaft 24. The outer edges of bushings 58, 62 are spaced from respectively adjacent mounting members 18 a distance to permit at least a predetermined amount of axial movement. Slideable support members 64, 66 are nonrotatably mounted, by a press fit, on the bushings member 64 on bushings 58, 60, and member 66 on bushing 62.

A rotatable member, such as roll 68, is rotatably supported on support members 64, 66 by bearings 70, 72 mounted on the exteriors of support members 64, 66. The axial position of roll 68 is fixed relative to support members 64, 66, and the bearings 70, 72 are secured, by virtue of shoulders provided on support members 64, 66 and in roll 68 and by retaining washers 74 engaging bearings 70, 72 opposite the shoulders.

A radially extending pin 76 fixedly connected to shaft 24 extends through an axially elongated slot 78 in support member 64 to permit axial movement of member 64 and to maintain said member 64 nonrotatable relative to shaft 24. A biasing member, compression spring 80, between an inwardly facing annular flange 82 provided on support member 64 and an oppositely facing shoulder 84 provided on shaft 24, urges support member 64 outwardly toward unit 12.

A portion 86 of support member 64 extends axially beyond the end of roll 68. A cam follower 88 fixedly connected to member 64 extends, radially relative to said shaft, from said member 64 to said cam face 54.

In operation, as worm 38 is turned, carrier 32 is rotated in a predetermined direction. As is more fully explained in U.S. Pat. No. 3,399,582 this results in linear reciprocation of shaft 24 transversely of units 12,12A and rotation of the shaft about its own axis in a direction opposite that of carrier 32. As transverse adjustment is made mounting member 18 rotates with shaft 24 in direction opposite that of carrier 32. A The cam follower 88, also rotating with shaft 24, engages cam face 54 resulting in axial adjustment of supports 64, 66 and roll 68 in accordance with the configuration of the cam face, as shown in FIG. 3. Spring 80 continually urges cam follower 54 into engagement with the cam face. Roll 68 is freely rotatable regardless of the transverse or axial positioning thereof. Due to the gear 14 and pinion 26 2:1 diameters and drive ratio and the resultant relative simultaneous rotation of the cam 52 and cam follower 88, axial adjustment in accordance with the cam face 54 configuration will occur twice in each full transverse adjustment cycle of shaft 24, i.e., in each 360° revolution of carrier 32 at 180° intervals in rotation.

Other embodiments will appear to those skilled in the art.

What I claim is:

1. In apparatus, for adjusting the position of a member on a shaft transversely of said apparatus, comprising an adjustment unit having: a rotatable carrier; a rotatable mounting member supported by said carrier eccentrically to the axis thereof; a shaft nonrotatably connected to said mounting member on one side thereof; and on the other side of said mounting member a pinion and internal gear in driving engagement, said pinion coaxial with and nonrotatably connected to said mounting member, said internal gear mounted coaxially of said carrier and nonrotatably relative thereto; that improvement in which a slideable member is axially moveably connected to said shaft nonrotatably relative thereto; an annular cam face is provided on said carrier, nonrotatably relative thereto, facing said shaft and concentric of said mounting member; a cam follower is connected to said slideable member, nonmovably relative thereto, and extends into engagement with said cam face; and a biasing member connected to said slideable member biasing said slideable member and said cam follower toward said cam face; whereby adjustment of said apparatus for transverse adjustment of said slideable member results in axial adjustment thereof in accordance with the configuration of said cam face.

2. The apparatus claimed in claim 1 in which said carrier and shaft axes are parallel to and equidistantly spaced from said mounting member axis, said pinion has a pitch diameter one half that of said internal gear, and the axis of said shaft lies on the pitch diameter of said pinion.

3. The apparatus claimed in claim 2 which includes a second adjustment unit provided opposite the other said unit, said second unit having carrier, mounting member, pinion and internal gear elements corresponding to, coaxially arranged relative to and in matching rotative positions relative to those of said other unit, said shaft connected to the mounting members of each unit nonrotatably relative thereto.

4. The apparatus claimed in claim 3 in which the inner radius of said annular cam face is at least as great as the maximum distance between said axis of the adjacent said mounting member and said shaft.

5. The apparatus claimed in claim 4 in which said biasing member is interconnected between said shaft and said slideable member.

6. The apparatus claimed in claim 4 including drive means connected to the carrier of one of said adjustment units for actuating said transverse and axial adjustment.

7. The apparatus claimed in claim 3 including a rotatable member independently rotatably mounted on said slideable member axially nonmovably relative thereto.

8. The apparatus claimed in claim 7 including a second slideable member axially moveably connected to said shaft and spaced therealong from the other said slideable member toward said second adjustment unit, said rotatable member also independently rotatably mounted thereon axially nonmovably relative thereto.

9. The apparatus claimed in claim 8 including drive means connected to the carrier of one of said adjustment units for actuating said transverse and axial adjustment.

10. The apparatus claimed in claim 9 in which said biasing member is a spring interconnected between said shaft and said slideable member.

11. The apparatus claimed in claim 10 including an axially elongated slot in said other slideable member and a pin fixedly connected to said shaft extending therefrom into said slot.